(12) United States Patent
Kuchi et al.

(10) Patent No.: US 11,968,146 B2
(45) Date of Patent: Apr. 23, 2024

(54) METHOD FOR COMMUNICATION IN A COMMUNICATION NETWORK

(71) Applicant: WISIG NETWORKS PRIVATE LIMITED, Madinaguda Hyderabad (IN)

(72) Inventors: Kiran Kumar Kuchi, Hyderabad (IN); Saidhiraj Amuru, Hyderabad (IN)

(73) Assignee: WISIG NETWORKS PRIVATE LIMITED (IN)

( * ) Notice: Subject to any disclaimer, the term of this patent is extended or adjusted under 35 U.S.C. 154(b) by 54 days.

(21) Appl. No.: 17/577,442

(22) Filed: Jan. 18, 2022

(65) Prior Publication Data

US 2022/0286258 A1 Sep. 8, 2022

(30) Foreign Application Priority Data

Mar. 1, 2021 (IN) .............................. 202141008419

(51) Int. Cl.
*H04L 5/00* (2006.01)
*H04L 27/01* (2006.01)

(52) U.S. Cl.
CPC .............. *H04L 5/0053* (2013.01); *H04L 27/01* (2013.01)

(58) Field of Classification Search
CPC .............................. H04L 5/0053; H04L 27/01
See application file for complete search history.

(56) References Cited

U.S. PATENT DOCUMENTS

| 6,177,951 B1 * | 1/2001 | Ghosh ...................... H04N 5/21 |
| 2016/0315721 A1 | 10/2016 | Lee et al. |
| 2022/0393817 A1 * | 12/2022 | Kuchi ................... H04L 5/0048 |

FOREIGN PATENT DOCUMENTS

| CN | 105359569 | 2/2016 |
| KR | 100668662 | 1/2007 |

OTHER PUBLICATIONS

Indian Examination Report Appln No. 202141008419 dated Sep. 23, 2022.

* cited by examiner

*Primary Examiner* — Ronald B Abelson
(74) *Attorney, Agent, or Firm* — McAndrews, Held & Malloy, Ltd.

(57) ABSTRACT

Embodiments of the present disclosure relate to a base station (BS) and method for communication in a communication network. The method comprising signaling at least one antenna port number from multiple antenna port numbers to a UE. Also, the method comprises receiving a data and a reference signal (RS) corresponding to the UE. The data and the RS are received on one or more receive antennas of the BS, wherein the RS comprises occupied RS subcarriers and null subcarriers. A location of occupied RS subcarriers and null subcarrier positions are selected according to signaled antenna port. Next, channel parameters are estimated using the occupied subcarriers associated with the received RS, and interference plus noise parameters using the null subcarriers. Thereafter, equalizing the received data on the receive antennas using the measured channel parameters and the interference plus noise parameters for interference rejection and data detection.

16 Claims, 8 Drawing Sheets

DMRS Configuration Type-1
Double-symbol DMRS
2 FD-OCC x 2 Combs x 2 TD-OCC

DMRS Configuration Type-2
Double-symbol DMRS
2 FD-OCC x 3 Frequency Offsets x 2 TD-OCC

METHOD FOR COMMUNICATION IN A COMMUNICATION NETWORK

CROSS-REFERENCE TO RELATED APPLICATIONS

This application claims priority from the Indian Provisional Patent Application Number 202141008419, filed on 1 Mar. 2021, the entirety of which are hereby incorporated by reference.

TECHNICAL FIELD

Embodiments of the present disclosure are related, in general to communication, but exclusively related to method of communication between plurality of base stations and a plurality of user equipment's.

BACKGROUND

Uplink coverage in 5G systems has been a major problem to solve in mobile communications due to maximum uplink transmit power and distance constraints. Channel estimation plays vital role in achieving the uplink coverage. That is Signal to Noise Ratio (SNR) or Signal to Interference plus Noise (I+N) Ratio (SINR) on received reference signal (RS) should be good enough to obtain reliable channel estimates. There are two ways in which uplink channel coefficients can be estimated. One is transmitting uplink Sounding Reference Signal (SRS) and another one is transmitting Demodulation Reference Signal (DMRS) along with PUSCH (Physical Uplink Shared Channel) to estimate uplink channel coefficients. These estimated uplink channel coefficients are used to construct the uplink receiver and there by detecting the data that is transmitted.

When the SNR or SINR on a received RS is low, channel estimation is not reliable. That is receiver weights constructed at Base Station (BS) using the estimated channel coefficients will not able to decode the data that is transmitted. There are different techniques to increase the coverage by increasing the maximum transmit power, deploying waveforms such as pi/2 BPSK to reduce the PAPR, introducing new MCS levels to support lower SINRs, and finding a way to reduce the inter-cell interference. To reduce inter-cell interference, different methods based on SRS and DMRS may be used.

FIG. 1 shows an illustration of Type-1 demodulation reference signal (DMRS) Configuration in 5G NR. FIG. 2 shows an illustration of Type-2 DMRS Configuration in 5G NR.

In 5G NR, two DMRS configuration types have support as shown in FIGS. 1 and 2. As shown in FIGS. 1 and 2, for configuration type-1, 6 subcarriers per PRB either even or odd are assigned to a port in case of single DMRS, 12 subcarriers either even or odd subcarriers and 2 symbols per PRB are assigned to a port in case of double symbol DMRS. Similarly, a maximum of 8 DMRS ports are supported in configuration type-1 as shown in FIG. 3.

FIG. 3 shows an illustration of a maximum DMRS Ports in Type-1 and Type-2 DMRS configuration. In case of configuration type-2, two groups of two consecutive subcarriers per PRB are assigned to a port in case of single DMRS, two groups of two consecutive subcarriers and 2 symbols per PRB are assigned to a port in case of double DMRS. In similar fashion, maximum of 12 DMRS ports are supported in configuration type-2 as shown in FIG. 3.

In 5G NR, UL SU-MIMO supports maximum of 4 layers. In generally, 4 ports for SU-MIMO transmission are used. For MU-MIMO, a maximum of 8 layers with configuration type-1 and maximum of 12 layers with configuration type-2 can be used. The DMRS configuration types provide a provision to alternate between ports that are used for the transmission of uplink DMRS and thereby reducing interference caused by the users of other cells on the DMRS transmissions. This helps in better channel estimation and improved equalization on the required data signals. Base station needs to signal the port number assigned to a user which thereby indicates the subcarrier tones to be used by the UE for the DMRS transmissions.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In one aspect of the present disclosure a method for communication in a communication network, said communication network comprising a plurality of BSs spatially distributed in a geographic region, at least one UE being communicatively connected to a BS, is disclosed. The method comprising signaling, by the BS, at least one antenna port number from a plurality of antenna port numbers to the at least one UE, for reference signal (RS) transmission. Also, the method comprises receiving, by the BS, a data and a RS corresponding to the at least one UE, the data and the RS are being received on one or more receive antennas of the at least one BS, wherein the RS comprises of occupied RS subcarriers and null subcarriers, a location of occupied RS subcarriers and null subcarrier positions are selected according to signaled at least one antenna port. Next, estimating, by the BS, one or more channel parameters using the occupied subcarriers associated with the received RS, and interference parameters using the null subcarriers, wherein the channel parameters and interference plus noise parameters are associated with one or more receive antennas of the BS. Thereafter, equalizing, by the BS, the received data on the one or more receive antennas using the measured channel parameters and the interference plus noise parameters corresponding to the at least one signaled port for interference rejection and data detection.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

Figure 1:
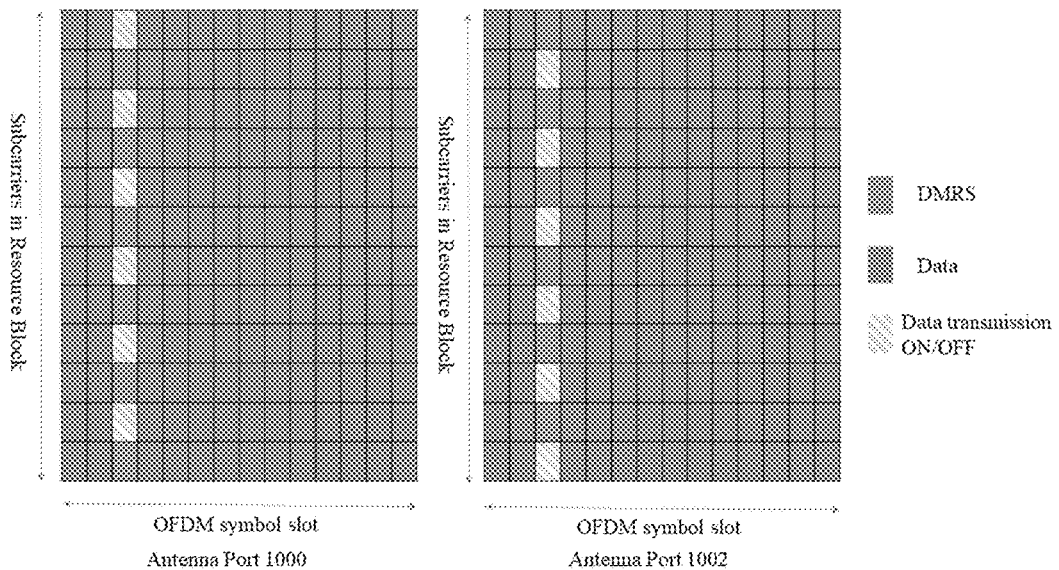
FIG. 1 shows an illustration of Type-1 demodulation reference signal (DMRS) Configuration in Fifth Generation New Radio (5G NR)
Figure 2:
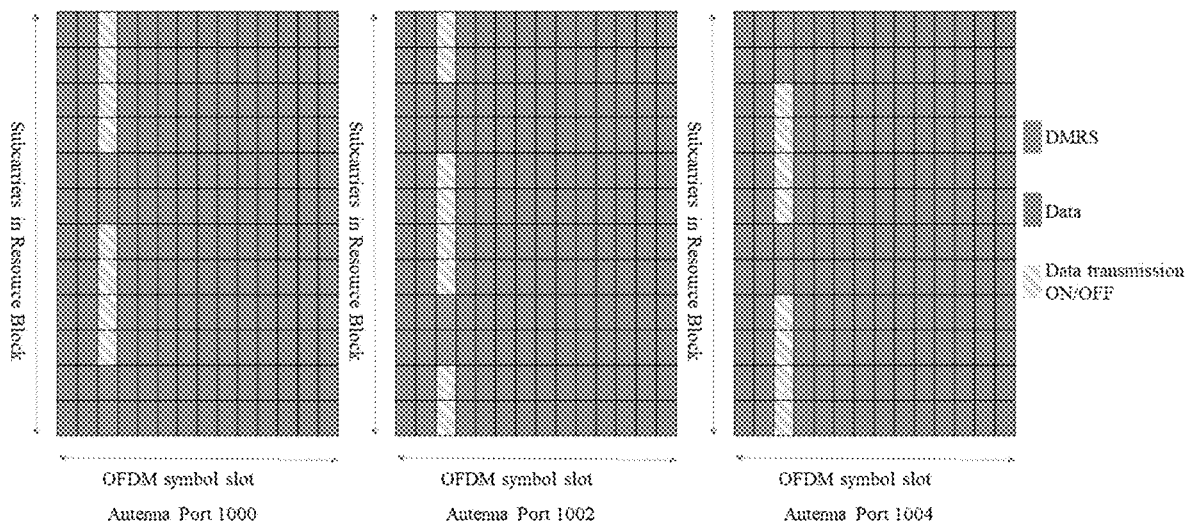
FIG. 2 shows an illustration of Type-2 DMRS Configuration in 5G NR.
Figure 3:
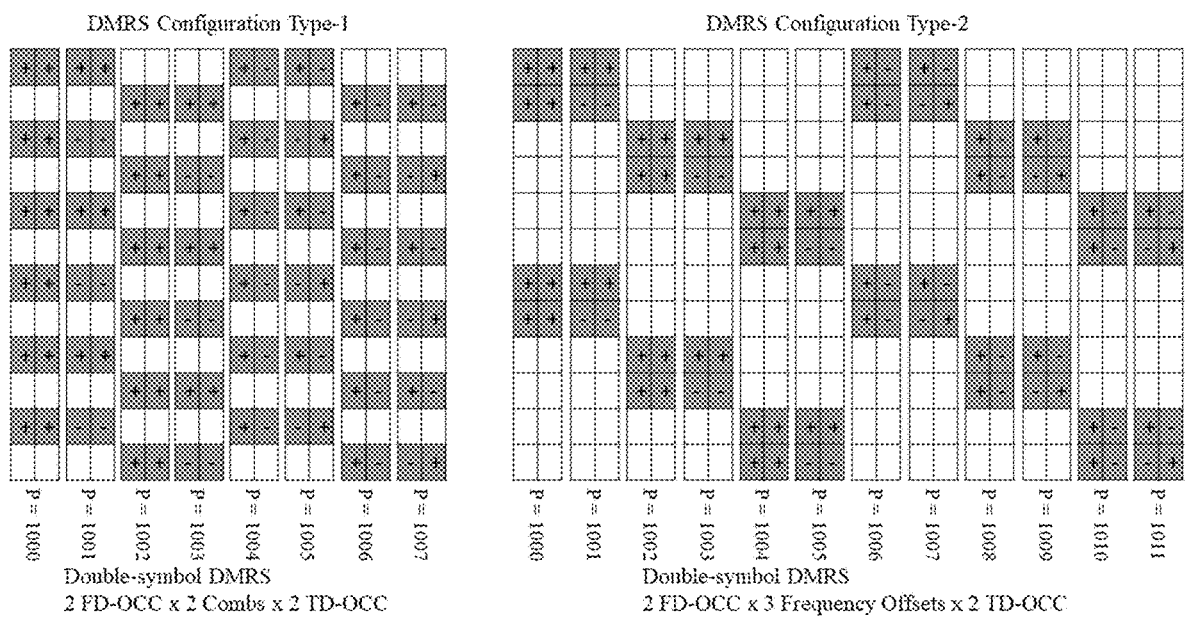
FIG. 3 shows an illustration of a maximum DMRS Ports in Type-1 and Type-2 DMRS configuration.
Figure 4A:
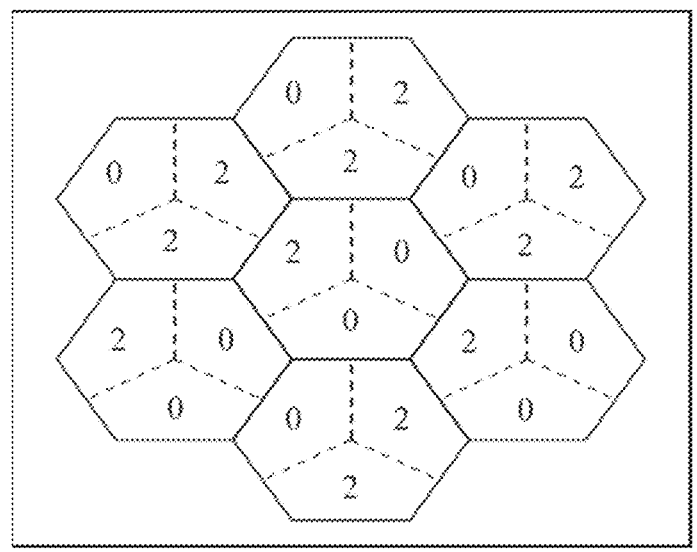
Figure 4B:
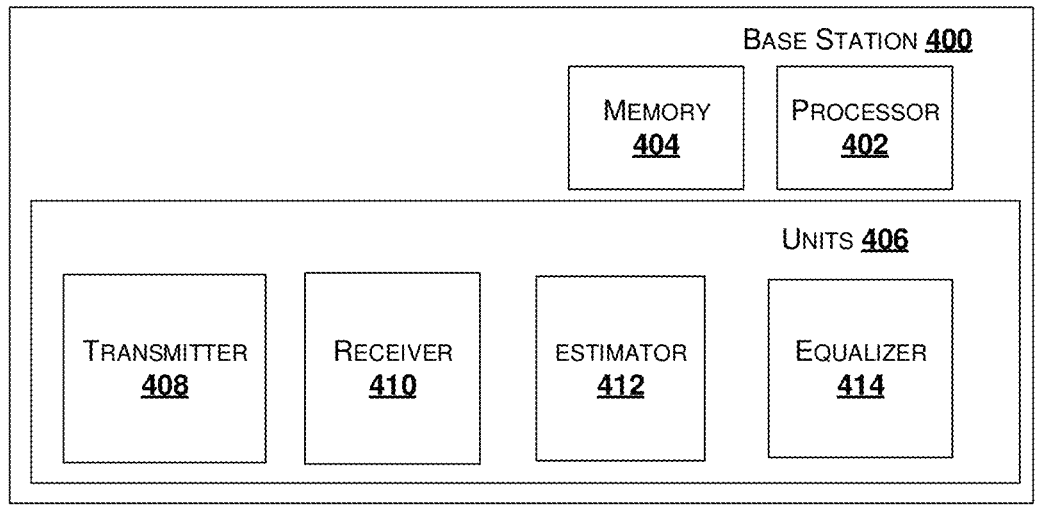
Figure 5:
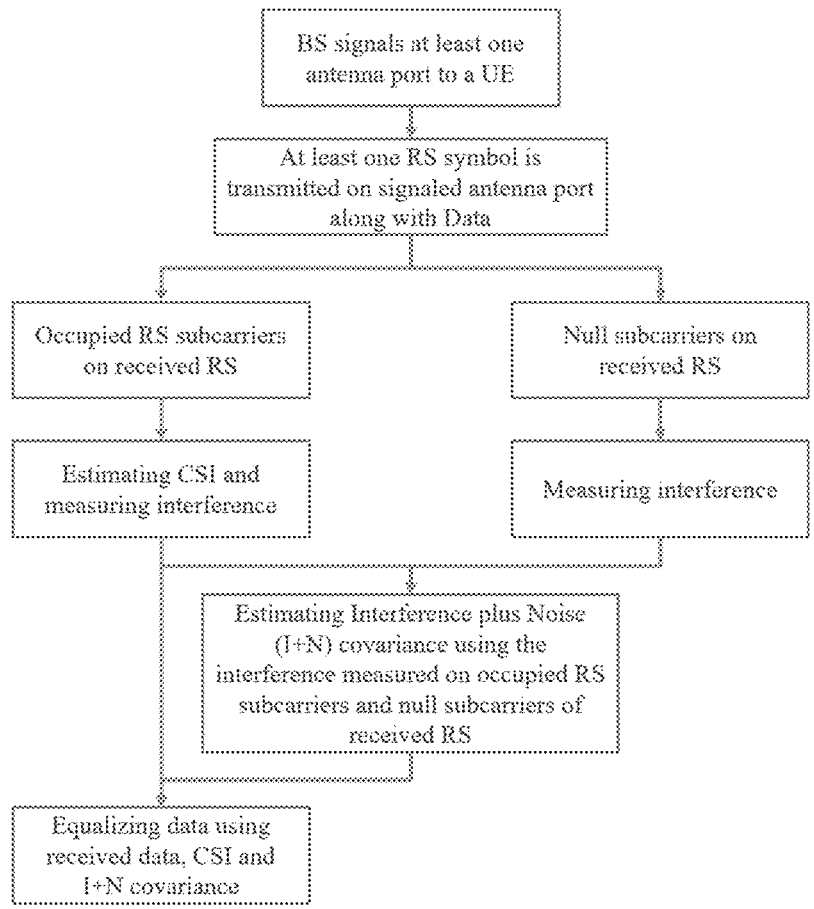
Figure 6:
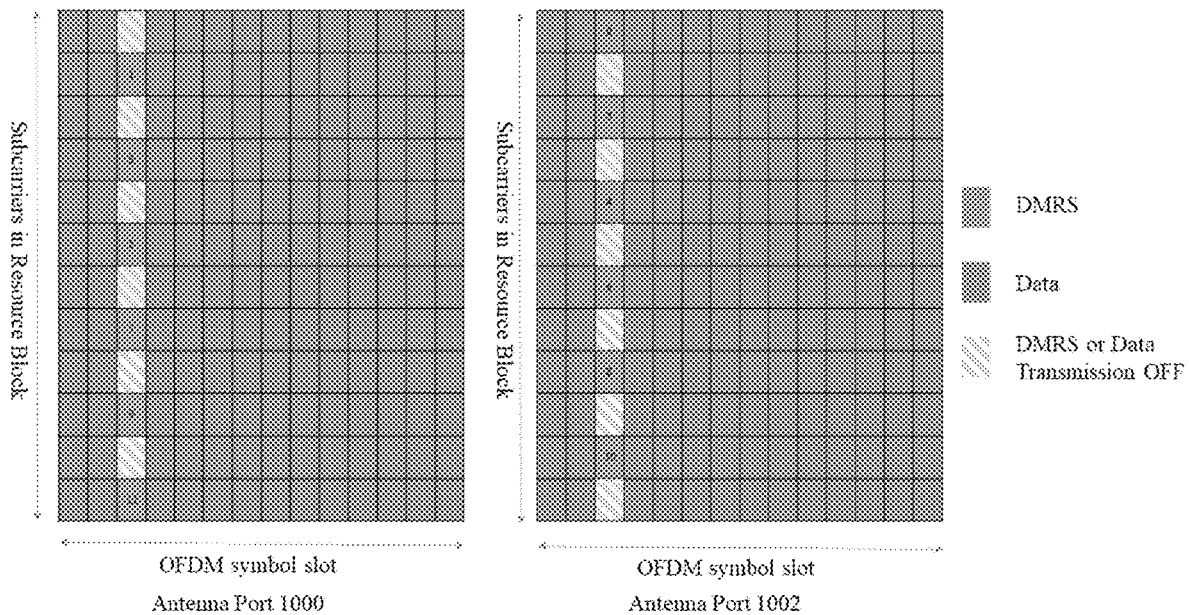
Figure 7:
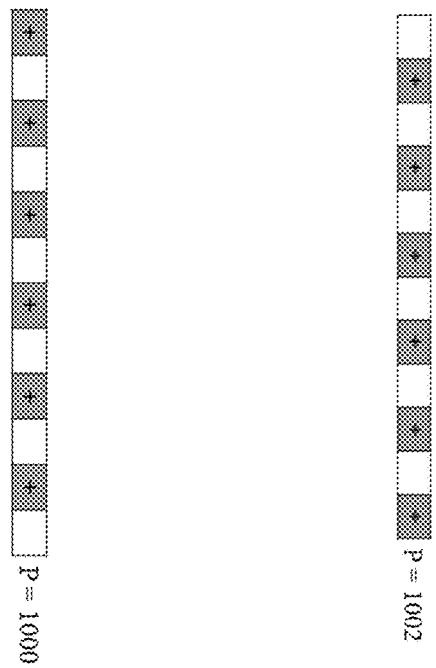
Figure 8:
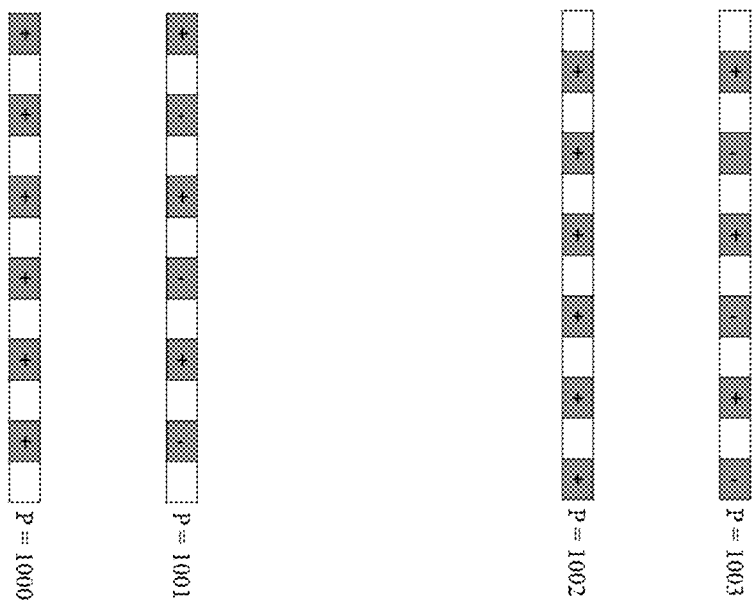
Figure 9:
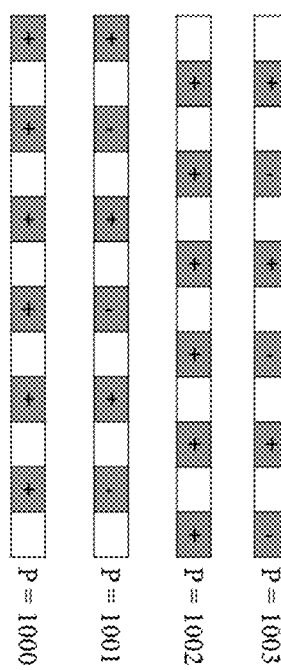
Figure 10:
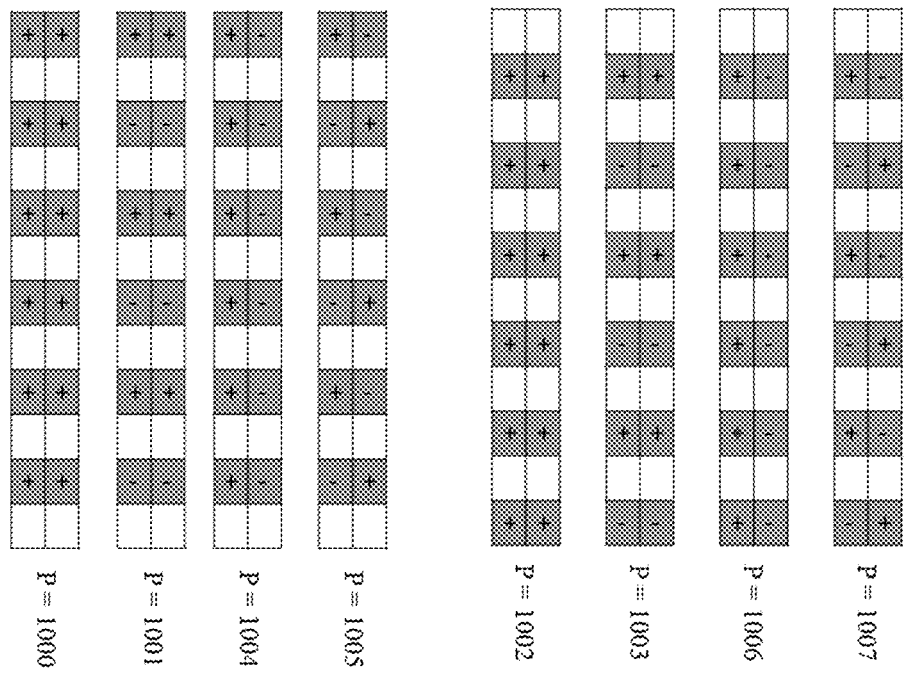
Figure 11:
Figure 12:
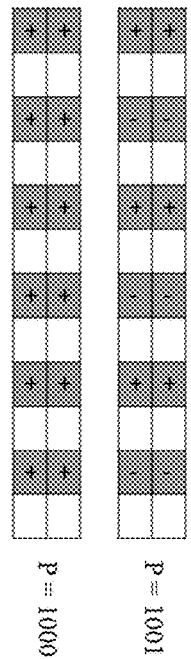
Figure 13:
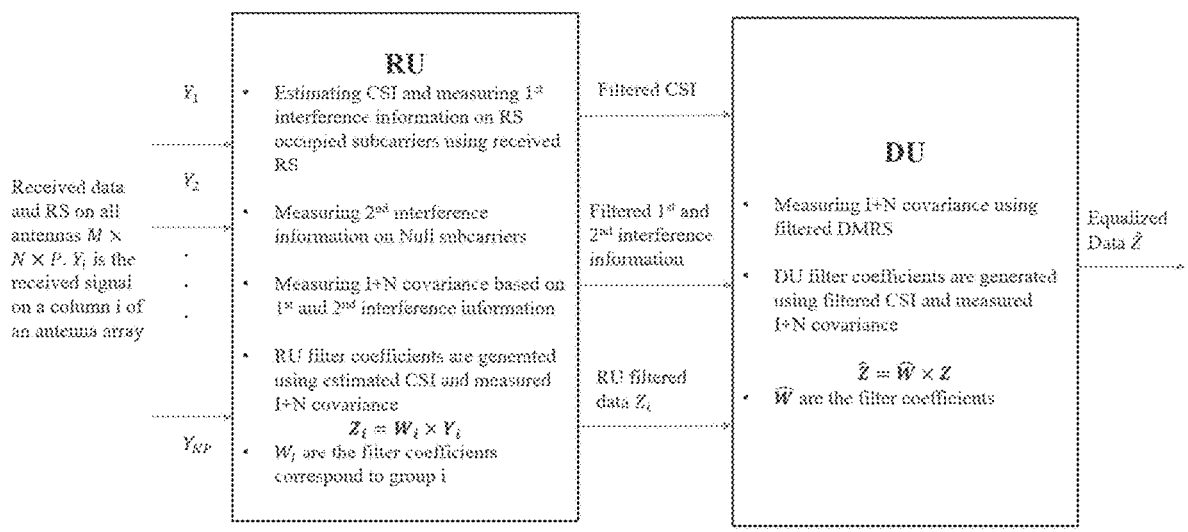
Figure 14:
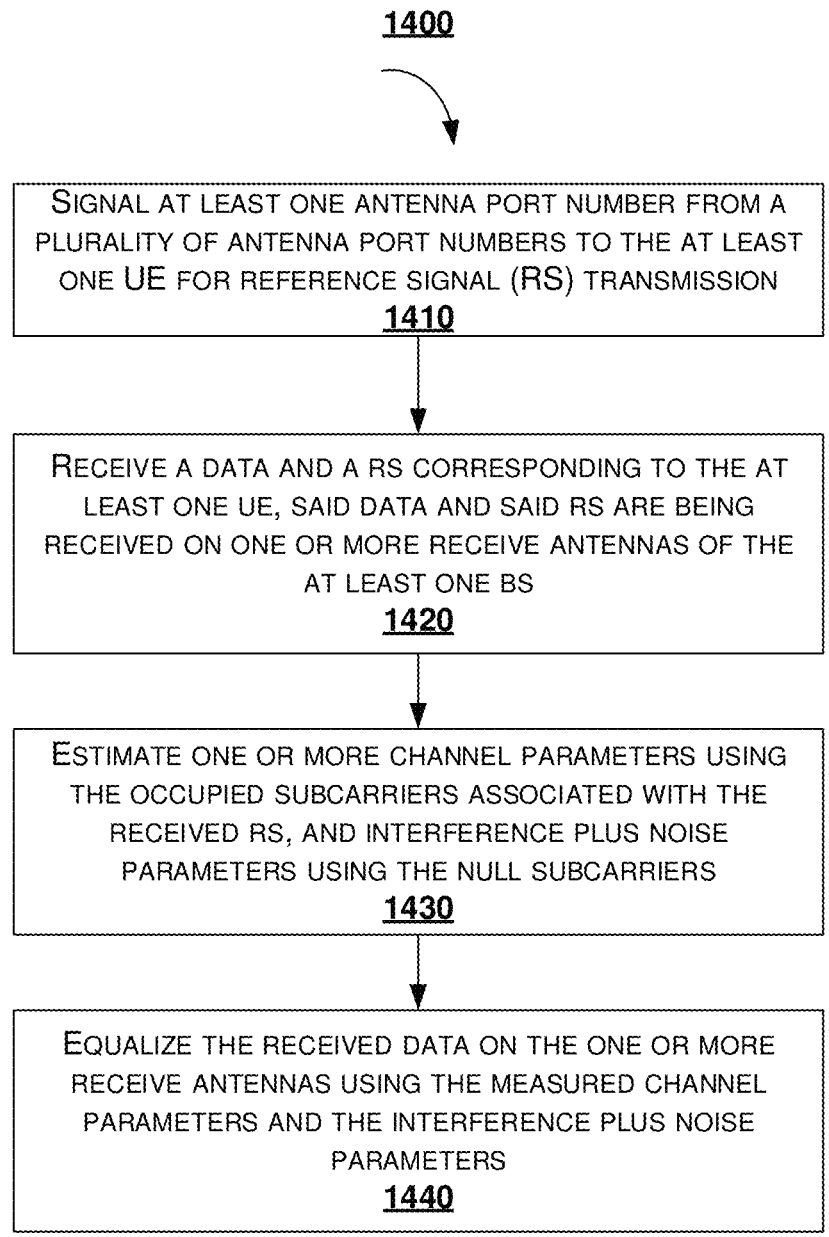

FIG. 4A port signaling based on cell ID for single layer single user (SU) multiple-input and multiple-output (MIMO);

FIG. 4B shows a block diagram of a base station (BS) for scheduling at least one user equipment (UE) in a communication network, in accordance with an embodiment of the present disclosure;

FIG. 5 shows a flowchart illustrating port signaling, channel state information (CSI) and I+N covariance estimation, and equalization, in accordance with an embodiment of the present disclosure;

FIG. 6 shows DMRS resource mapping for single layer SU-MIMO, in accordance with an embodiment of the present disclosure;

FIG. 7 shows an alternative port signaling for single layer SU-MIMO, in accordance with an embodiment of the present disclosure;

FIG. 8 shows an alternative port signaling for 2-layer transmission, in accordance with an embodiment of the present disclosure, in accordance with an embodiment of the present disclosure;

FIG. 9 shows a 4-layer transmission with single symbol DMRS, in accordance with an embodiment of the present disclosure;

FIG. 10 shows a port signaling for 4-layer transmission, in accordance with another embodiment of the present disclosure;

FIG. 11 shows single layer SU-MIMO with double symbol DMRS, in accordance with an embodiment of the present disclosure;

FIG. 12 shows a two layer SU-MIMO with double symbol DMRS, in accordance with an embodiment of the present disclosure;

FIG. 13 shows a block diagram representation of a two-stage filtering, in accordance with an embodiment of the present disclosure; and FIG. 14 shows a flowchart illustrating a method for communication in a communication network, in accordance with some embodiments of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Embodiments of the present disclosure provide method of communication using DMRS Port Signaling.

An antenna port indicates an allocation of subcarriers and time domain symbols for a reference signal. FIG. 4A port signaling based on cell ID for single layer single user (SU) multiple-input and multiple-output (MIMO). As shown in FIG. 4A, for single layer SU-MIMO transmission, users in different sectors are assigned with alternative port numbers to avoid any collision. Port signaling can be made function of parameters like cell Id or user Id. For example, in a given cell site, first sector assigns port 2 to the user scheduled in the first sector, second sector assigns port 0 to the user scheduled in the second sector, and third sector assigns port 2 to the user scheduled in the third sector. By doing this, a user scheduled in the first sector will have interference only from the sectors that use port 2 for the user scheduled in those sectors. Similarly, a user scheduled in the second sector will have interference from the sectors that use port 0 for the user scheduled in those sectors. By doing this alternative port signaling, inter-cell interference can be reduced.

In order to achieve this reduction in inter-cell interference in single layer SU-MIMO scenario, a user has to send DMRS only on the port indicated to the UE (i.e., the subcarriers and symbol locations) and should not transmit either DMRS or data on the tones and symbols associated with the another port. That is, in DMRS configuration type-1, if a user sends DMRS on even subcarriers, it does not use odd subcarriers for any kind of transmission. Similar procedure is valid for a user sending DMRS on odd subcarriers.

FIG. 4B shows a block diagram of a base station (BS) in a communication network, in accordance with an embodiment of the present disclosure. The communication network comprises a plurality of BSs spatially distributed in a geographic region, at least one UE being communicatively connected to a BS.

As shown in FIG. 4B, the BS 400 comprises a processor 402, and memory 404 coupled with the processor. The BS 400 may be referred as a communication system. The processor 402 may be configured to perform one or more functions of the BS 400 for communication in the communication network. In one implementation, the BS 400 may comprise blocks 406, also referred as modules or units 406 for performing various operations in accordance with the embodiments of the present disclosure. In an embodiment, the communication network comprising a plurality of BSs spatially distributed in a geographic region, and at least one UE being communicatively connected to a BS. The BS 400 comprises a plurality of antennas (not shown in the Figure).

The blocks 406 includes a transmitter 408, a receiver 410, an estimator 412 and an equalizer 414. In an embodiment, the transmitter 408 may comprise a plurality of transmitters. In an embodiment, the receiver 410 may comprise a plurality of receivers.

The transmitter 408 signals to the at least one UE with at least one antenna port number from a plurality of antenna port numbers, for reference signal (RS) transmission. In an embodiment, the RS is a demodulation reference signal (DMRS). In an embodiment, location of occupied RS subcarriers and null subcarrier positions are selected with one of one OFDM symbol and one or more OFDM symbols. Each of the plurality of BS signals at least one antenna port from a plurality of antenna port numbers to a connected UE. The port number signaled by at least two BS are distinct.

The receiver 410 receives a data and a RS corresponding to the at least one UE. The data and the RS are being received on one or more receive antennas of the BS 400. The RS comprises occupied RS subcarriers and null subcarriers, a location of occupied RS subcarriers and null subcarrier positions are selected according to signaled at least one antenna port.

The estimator 412, also referred as an estimation unit, estimates one or more channel parameters using the occupied subcarriers associated with the received RS, and interference parameters using the null subcarriers. The channel parameters and interference plus noise parameters are associated with one or more receive antennas of the BS. The channel parameters are channel state information (CSI) associated with the at least one connected UE. Also, the estimator 412 estimates an interference plus noise covariance using the interference plus noise parameters.

The equalizer 414, also referred as equalization unit or equalizer unit, equalizes the received data on the one or more receive antennas using the measured channel parameters and the interference parameters corresponding to the at least one signaled port for interference rejection and data detection. The equalizing includes one or more equalization coefficients that are determined using at least one of the CSI and the interference plus noise covariance. Thus, the inter-cell interference is reduced and reliability of the measured I+N covariance is increased.

FIG. 5 shows a flowchart illustrating port signaling, channel state information (CSI) and interference plus noise (I+N) covariance estimation, and equalization, in accordance with an embodiment of the present disclosure. As shown in FIG. 5, estimation of CSI and measuring of interference are performed on RS occupied subcarriers. Whereas on null subcarriers only interference is measured.

The I+N covariance is estimated using measured interference. The estimated CSI and the I+N covariance are used for equalization.

Also, as shown in FIG. 5, estimation of I+N Covariance is performed by considering the following:

Let Y is the received signal on a given OFDM symbol and given subcarrier on all the antennas which will be of the form Y=HX+I+N is of the size $N_r \times 1$
where, $N_r$ are the number of receive antennas at base station H is the channel of size $N_r \times 1$ assuming one layer transmission from the user X is one of data and reference signals of size 1×1, I is the inter-cell interference of size $N_r \times 1$, and N is the background noise of size $N_r \times 1$ All the variables are shown for a given sub-carrier in a given OFDM symbol.

$R_I = I \times I'$ is the measured covariance of interference plus noise. In some embodiments, interference covariance is measured only on the port that is assigned to a user in a particular sector.

FIG. 6 shows DMRS resource mapping for single layer SU-MIMO, in accordance with an embodiment of the present disclosure. As shown in FIG. 6, a single layer SU-MIMO transmission with alternative port signaling is assumed. When an alternate port signaling is enabled for single layer SU-MIMO, users from some sectors transmit DMRS on port 1000 and users from remaining sectors transmit DMRS on port 1002. Let say a sector j assigned port 1002 to the user scheduled in that sector, then base station estimates channel on even subcarriers, that is on subcarriers (0,2,4,6,8,10). Interference plus noise is measured on even subcarriers which will be of the form $I_{even} = \Sigma_{i=1}^{N_{I,even}^j} H_{p,i}^{even} X_p + N$ where, $N_{I,even}^j$ are the number of interfering sectors for the user scheduled in sector j, that is users from other sectors using as an example port 1002 i.e., even subcarriers for DMRS transmission, Where $H_{p,i}^{even}$ is the channel seen from a user from interfering sector i to the base station in sector j on even subcarriers, and $X_p$ is the DMRS symbols corresponds to the user in interfering sector i Similarly, interference plus noise measured on the odd subcarriers will be used for averaging. That is Interference plus noise is measured on even subcarriers which will be of the form $I_{odd} = \Sigma_{i=1}^{N_{I,odd}^j} H_{p,i}^{odd} X_p + N$ where, $N_{I,odd}^j$ are the number of interfering sectors in which user uses as an example port 1000 i.e., odd subcarriers for DMRS transmission where $H_{p,i}$ is the channel seen from a user from interfering sector i to the base station in sector j, and $X_p$ is the DMRS symbols corresponds to the user in interfering sector i $I_{even}$ and $I_{odd}$ are used to measure interference plus noise covariance $R_I$ One embodiment of the present disclosure is port signaling for combination-1 i.e. for One Layer SU-MIMO with Single Symbol DMRS.

FIG. 7 shows an alternative Port Signaling for single layer SU-MIMO, in accordance with an embodiment of the present disclosure. DMRS resource mapping for single layer SU-MIMO in case of DMRS configuration type-1 will be as shown in FIG. 7. As shown in FIG. 7, ports 1000 and 1001 are used for single layer SU-MIMO transmission. Users are alternatively assigned with port 1000 and 1001. Users with port 1000 DMRS experiences interference from the users from the other sectors which use port 1000 for DMRS transmission. Similarly, Users with port 1001 DMRS experiences interference from the users from the other sectors which use port 1001 for DMRS transmission.

For Estimation of interference plus noise covariance, assuming interference plus noise estimation on a given OFDM symbol within a PRB and estimation is done for a user with port 1000 assigned for DMRS transmission $$y_1 = h_1 p_1 + \sum_{l=1}^{L_1} g_l p'_l + n_1$$

$$I_1 = y_1 - h_1 p_1 \Rightarrow R_1 = I_1 \times I_1^H$$

Interference plus noise samples on null tones will be of the form $$y_2 = I_2 = \sum_{l=1}^{L_2} g_l p''_l + n_2$$

$$R_2 = I_2 \times I_2^H$$

Where, $y_1$ is the received DMRS on 1st RE and $y_2$ is the received DMRS on 2nd RE, $I_1$ and $I_2$ are the estimated interference plus noise samples on 1st and 2nd RE, $R_1$ and $R_2$ are the estimated interference plus noise covariance matrices on 1st and 2nd RE, $L_1$ are the number of interfering users from other sectors that are assigned with port 1000 for DMRS transmission, $L_2$ are the number of interfering users from other sectors that are assigned with port 1002 for DMRS transmission.

Similarly, $R_i$s are calculated on all REs $$I+N \text{ covariance is } R_I = \frac{R_1 + R_2 + R_3 + \cdots + R_{12}}{12}$$

One embodiment of the present disclosure is a 2-Layer SU-MIMO Transmission with Single Symbol DMRS.

FIG. 8 shows an alternative port signaling for 2-layer transmission, in accordance with an embodiment of the present disclosure, in accordance with an embodiment of the present disclosure. For 2-layer SU-MIMO transmission, DMRS can be configured as follows in case of DMRS configuration type-1, i.e., 2-symbol DMRS can be configured with OCC for supporting 2-ports of a single UE. As shown in FIG. 8, port signaling is done in such a way that inter-cell interference can be reduced for 2-layer transmission. Users in different sectors are alternatively assigned with ports (1000,1001) and (1002,1003). This kind of port signaling reduces inter-cell interference in case of 2-layer transmission. However, there would be inter-layer interference which needs to be mitigated.

One embodiment of the present disclosure is Interference plus noise covariance estimation. Considering interference plus noise estimation on a given OFDM symbol within a PRB and estimation is done for a user with ports 1000 and 1001 assigned for DMRS transmission $$y_1 = h_1 p_1 + h_2 p_2 + \sum_{l=1}^{L_1} g_{l,1} p'_{l,1} + g_{l,2} p'_{l,2} + n_1$$

-continued $$y_3 = h_1 p_1 - h_2 p_2 + \sum_{l=1}^{L_1} g_{l,1} p'_{l,1} - g_{l,2} p'_{l,2} + n_3$$

$$I_1 = y_1 - (h_1 p_1 + h_2 p_2) \Rightarrow R_1 = I_1 \times I_1^H$$

$$I_3 = y_3 - (h_1 p_1 - h_2 p_2) \Rightarrow R_3 = I_3 \times I_3^H$$

Interference plus noise samples on null tones will be of the below form $$y_2 = I_2 = \sum_{l=1}^{L_2} g'_{l,1} p''_{l,1} + g'_{l,2} p''_{l,2} + n_2$$

$$R_2 = I_2 \times I_2^H$$

where, $y_1$ is the received DMRS on 1st RE, $y_2$ is the received DMRS on 2nd RE, and $y_3$ is the received DMRS on 3rd RE, $g_{l,1}$ is the channel seen on port 1000 from the user in sector 1 and $g_{l,2}$ is the channel seen on port 1001 from the user in sector 1

$I_1$, $I_2$, and $I_3$ are the estimated interference plus noise samples on 1st RE, 2nd RE and 3rd RE, $R_1$, $R_2$, and $R_3$ are the estimated interference plus noise covariance matrices on 1st RE, 2nd RE, and 3rd RE, $L_1$ are the number of interfering users from other sectors that are assigned with port 1000 and 1001 for DMRS transmission, $L_2$ are the number of interfering users from other sectors that are assigned with port 1002 and 1003 for DMRS transmission.

Similarly, $R_i$s are calculated on all REs $$I+N \text{ covariance is } R_I = \frac{R_1 + R_2 + R_3 + \cdots + R_{12}}{12}$$

One embodiment of the present disclosure is 4-Layer SU-MIMO Transmission with Single Symbol DMRS.

FIG. 9 shows a 4-layer transmission with single symbol DMRS, in accordance with an embodiment of the present disclosure. As shown in FIG. 9, users in all the sectors are assigned with ports (1000,1001,1002,1003). For 4-layer SU-MIMO transmission, DMRS can be configured as follows in case of DMRS configuration type-1. There would be inter-layer interference and inter-cell interference which need to be mitigated.

For Interference plus noise covariance estimation, assuming that interference plus noise estimation on a given OFDM symbol is within a PRB and estimation is performed for a user with ports 1000, 1001, 1002 and 1003 assigned for DMRS transmission $$y_1 = h_1 p_1 + h_2 p_2 + \sum_{l=1}^{L} g_{l,1} p'_{l,1} + g_{l,2} p'_{l,2} + n_1$$

$$y_3 = h_1 p_1 - h_2 p_2 + \sum_{l=1}^{L} g_{l,1} p'_{l,1} - g_{l,2} p'_{l,2} + n_3$$

$$y_2 = h_3 p_1 + h_4 p_2 + \sum_{l=1}^{L} g_{l,3} p'_{l,1} + g_{l,4} p'_{l,2} + n_2$$

-continued $$y_4 = h_3 p_1 - h_4 p_2 + \sum_{l=1}^{L} g_{l,3} p'_{l,1} - g_{l,4} p'_{l,2} + n_4$$

$$I_1 = y_1 - (h_1 p_1 + h_2 p_2) \Rightarrow R_1 = I_1 \times I_1^H$$

$$I_3 = y_3 - (h_1 p_1 - h_2 p_2) \Rightarrow R_3 = I_3 \times I_3^H$$

$$I_2 = y_2 - (h_3 p_1 + h_4 p_2) \Rightarrow R_2 = I_2 \times I_2^H$$

$$I_4 = y_4 - (h_3 p_1 - h_4 p_2) \Rightarrow R_4 = I_4 \times I_4^H$$

where, $y_1$ is the received DMRS on 1st RE, $y_2$ is the received DMRS on 2nd RE, $y_3$ is the received DMRS on 3rd RE, and $y_4$ is the received DMRS on 4th RE $g_{l,1}$ is the channel seen on port 1000 from the user in sector 1, $g_{l,2}$ is the channel seen on port 1001 from the user in sector 1, $g_{l,3}$ is the channel seen on port 1002 from the user in sector 1, and $g_{l,4}$ is the channel seen on port 1003 from the user in sector 1

$I_1$, $I_2$, $I_3$ and $I_4$ are the estimated interference plus noise samples on 1st RE, 2nd RE, 3rd RE, and 4th RE $R_1$, $R_2$, $R_3$, and $R_4$ are the estimated interference plus noise covariance matrices on 1st RE, 2nd RE, 3rd RE, and 4th RE L are the number of interfering users from other sectors Similarly, $R_i$s are calculated on all REs $$I + N \text{ covariance is } R_I = \frac{R_1 + R_2 + R_3 + \cdots + R_{12}}{12}$$

One embodiment of the present disclosure is Port signaling for combination-2, i.e. for 4-Layer Transmission with Double Symbol DMRS. For 4-layer SU-MIMO transmission, DMRS can be configured as follows in case of DMRS configuration type-1.

FIG. 10 shows a port signaling for 4-layer transmission, in accordance with another embodiment of the present disclosure. As shown in FIG. 10, port signaling is done in such a way that inter-cell interference can be reduced for 4-layer transmission. Users in different sectors are alternatively assigned with ports (1000,1001,1004,1005) and (1002,1003,1006,1007). This kind of port signaling reduces inter-cell interference in case of 4-layer transmission. However, there would be inter-layer interference which needs to be mitigated.

For Interference plus noise covariance estimation, assuming that interference plus noise estimation on double symbol DMRS is within a PRB and estimation is performed for a user with ports 1000, 1001, 1004 and 1005 assigned for DMRS transmission $y_{11} =$ $$h_1 p_1 + h_2 p_2 + h_3 p_3 + h_4 p_4 + \sum_{l=1}^{L_1} g_{l,1} p'_{l,1} + g_{l,2} p'_{l,2} + g_{l,3} p'_{l,3} + g_{l,4} p'_{l,4} + n_{11}$$

$y_{12} =$ $$h_1 p_1 + h_2 p_2 - h_3 p_3 - h_4 p_4 + \sum_{l=1}^{L_1} g_{l,1} p'_{l,1} + g_{l,2} p'_{l,2} - g_{l,3} p'_{l,3} - g_{l,4} p'_{l,4} + n_{12}$$

$y_{31} =$

-continued $$h_1 p_1 - h_2 p_2 + h_3 p_3 - h_4 p_4 + \sum_{l=1}^{L_1} g_{l,1} p'_{l,1} - g_{l,2} p'_{l,2} - g_{l,3} p'_{l,3} + g_{l,4} p'_{l,4} + n_{31}$$

$y_{32} =$ $$h_1 p_1 - h_2 p_2 - h_3 p_3 + h_4 p_4 + \sum_{l=1}^{L_1} g_{l,1} p'_{l,1} - g_{l,2} p'_{l,2} - g_{l,3} p'_{l,3} + g_{l,4} p'_{l,4} + n_{32}$$

$$y_{21} = \sum_{l=1}^{L_2} g'_{l,1} p''_1 + g'_{l,2} p''_2 + g'_{l,3} p''_3 + g'_{l,4} p''_4 + n_{21}$$

$$y_{22} = \sum_{l=1}^{L_2} g'_{l,1} p''_1 + g'_{l,2} p''_2 - g'_{l,3} p''_3 - g'_{l,4} p''_4 + n_{22}$$

$$I_{11} = y_{11} - (h_1 p_1 + h_2 p_2 + h_3 p_3 + h_4 p_4) \Rightarrow R_{1,1} = I_{11} \times I_{11}^H$$

$$I_{12} = y_{12} - (h_1 p_1 + h_2 p_2 - h_3 p_3 - h_4 p_4) \Rightarrow R_{1,2} = I_{12} \times I_{12}^H$$

$$I_{31} = y_{31} - (h_1 p_1 - h_2 p_2 + h_3 p_3 - h_4 p_4) \Rightarrow R_{3,1} = I_{31} \times I_{31}^H$$

$$I_{32} = y_{32} - (h_1 p_1 - h_2 p_2 - h_3 p_3 + h_4 p_4) \Rightarrow R_{3,2} = I_{32} \times I_{32}^H$$

$$I_{21} = y_{21} \Rightarrow R_{2,1} = I_{21} \times I_{21}^H$$

$$I_{22} = y_{22} \Rightarrow R_{2,2} = I_{22} \times I_{22}^H$$

where, $y_{11}$ the received DMRS on 1st RE in 1st symbol, $y_{12}$ is the received DMRS on 1st RE in 2nd symbol, $y_{31}$ is the received DMRS on 3rd RE in 1st symbol, and $y_{32}$ is the received DMRS on 3rd RE in 2nd symbol $g_{l,1}$ is the channel seen on port 1000 from the user in sector 1, $g_{l,2}$ is the channel seen on port 1001 from the user in sector 1, $g_{l,3}$ is the channel seen on port 1004 from the user in sector 1, and $g_{l,4}$ is the channel seen on port 1005 from the user in sector 1

$I_{11}$ and $I_{12}$ are the estimated interference plus noise samples on 1st RE in 2 symbols, $I_{31}$ and $I_{32}$ are the estimated interference plus noise samples on 3rd RE in 2 symbols, and $I_{21}$ and $I_{22}$ are the estimated interference plus noise samples on 2nd RE in 2 symbols $R_{1,1}$ and $R_{1,2}$ are the estimated interference plus noise covariance matrices on 1st RE in 2 symbols, $R_{2,1}$ and $R_{2,2}$ are the estimated interference plus noise covariance matrices on 2nd RE in 2 symbols, and $R_{3,1}$ and $R_{3,2}$ are the estimated interference plus noise covariance matrices on 3rd RE in 2 symbols $L_1$ are the number of interfering users from other sectors that are assigned with ports 1000, 1001, 1004, and 1005 for DMRS transmission $L_2$ are the number of interfering users from other sectors that are assigned with ports 1002, 1003, 1006, and 1007 for DMRS transmission Similarly, $R_i$s are calculated on all REs from both symbols $I + N$ covariance is $R_I =$ $$\frac{R_{1,1} + R_{1,2} + R_{2,1} + R_{2,2} + R_{31} + R_{32} + \cdots + R_{12,1} + R_{12,2}}{12 \times 2}$$

One embodiment of the present disclosure is 1-Layer and 2-Layer SU-MIMO transmission with Double Symbol DMRS. 1-Layer and 2-Layer SU-MIMO transmission can be seen as a subset of 4-Layer SU-MIMO transmission. DMRS can be configured as follows in case of DMRS configuration type-1.

FIG. 11 shows single layer SU-MIMO with double symbol DMRS, in accordance with an embodiment of the present disclosure. FIG. 12 shows a two layer SU-MIMO with double symbol DMRS, in accordance with an embodiment of the present disclosure. As shown in FIGS. 11 and 12, port signaling is performed such that the inter-cell interference can be reduced for 1-layer and 2-layer SU-MIMO transmission. For example, users in some sectors are assigned with port 1000 for 1-layer SU-MIMO transmission and ports (1000,1001 ) for 2-layer SU-MIMO transmission. Users in some other sectors are assigned with port 1002 for 1-layer SU-MIMO transmission and ports (1002,1003) for 2-layer SU-MIMO transmission. This kind of port signaling reduces inter-cell interference in case of 1-layer and 2-layer SU-MIMO transmission. Also, the port signaling facilitates in better channel estimation with more DMRS REs and better interference plus noise covariance estimation with more null tones. However, there would be inter-layer interference in case of 2-layer SU-MIMO transmission which needs to be mitigated.

Interference plus noise covariance estimation for 1-Layer SU-MIMO, assuming interference plus noise estimation on double symbol DMRS within a PRB and estimation is performed for a user with port 1000 assigned for DMRS transmission $$y_{11} = h_1 p_1 + \sum_{l=1}^{L_1} g_{l,1} p'_{l,1} + g_{l,2} p'_{l,2} + g_{l,3} p'_{l,3} + g_{l,4} p'_{l,4} + n_{11}$$

$$y_{12} = h_1 p_1 + \sum_{l=1}^{L_1} g_{l,1} p'_{l,1} + g_{l,2} p'_{l,2} - g_{l,3} p'_{l,3} - g_{l,4} p'_{l,4} + n_{12}$$

$$y_{31} = h_1 p_1 + \sum_{l=1}^{L_1} g_{l,1} p'_{l,1} - g_{l,2} p'_{l,2} - g_{l,3} p'_{l,3} + g_{l,4} p'_{l,4} + n_{31}$$

$$y_{32} = h_1 p_1 + \sum_{l=1}^{L_1} g_{l,1} p'_{l,1} - g_{l,2} p'_{l,2} - g_{l,3} p'_{l,3} + g_{l,4} p'_{l,4} + n_{32}$$

$$y_{21} = \sum_{l=1}^{L_2} g'_{l,1} p''_1 + g'_{l,2} p''_2 + g'_{l,3} p''_3 + g'_{l,4} p''_4 + n_{21}$$

$$y_{22} = \sum_{l=1}^{L_2} g'_{l,1} p''_1 + g'_{l,2} p''_2 - g'_{l,3} p''_3 - g'_{l,4} p''_4 + n_{22}$$

$$I_{11} = y_{11} - h_1 p_1 \Rightarrow R_{1,1} = I_{11} \times I_{11}^H$$

$$I_{12} = y_{12} - h_1 p_1 \Rightarrow R_{1,2} = I_{12} \times I_{12}^H$$

$$I_{31} = y_{31} - h_1 p_1 \Rightarrow R_{3,1} = I_{31} \times I_{31}^H$$

$$I_{32} = y_{32} - h_1 p_1 \Rightarrow R_{3,2} = I_{32} \times I_{32}^H$$

$$I_{21} = y_{21} \Rightarrow R_{2,1} = I_{21} \times I_{21}^H$$

$$I_{22} = y_{22} \Rightarrow R_{2,2} = I_{22} \times I_{22}^H$$

where, $y_{11}$ the received DMRS on 1st RE in 1st symbol, $y_{12}$ is the received DMRS on 1st RE in 2nd symbol, $y_{31}$ is the received DMRS on 3rd RE in 1st symbol, and $y_{32}$ is the received DMRS on 3rd RE in 2nd symbol $g_{l,1}$ is the channel seen on port 1000 from the user in sector l, $g_{l,2}$ is the channel seen on port 1001 from the user in sector l, $g_{l,3}$ is the channel seen on port 1004 from the user in sector l, and $g_{l,4}$ is the channel seen on port 1005 from the user in sector l $I_{11}$ and $I_{12}$ are the estimated interference plus noise samples on 1st RE in 2 symbols, $I_{31}$ and $I_{32}$ are the estimated interference plus noise samples on 3rd RE in 2 symbols, and $I_{21}$ and $I_{22}$ are the estimated interference plus noise samples on 2nd RE in 2 symbols $R_{1,1}$ and $R_{1,2}$ are the estimated interference plus noise covariance matrices on 1st RE in 2 symbols, $R_{2,1}$ and $R_{2,2}$ are the estimated interference plus noise covariance matrices on 2nd RE in 2 symbols, and $R_{3,1}$ and $R_{3,2}$ are the estimated interference plus noise covariance matrices on 3rd RE in 2 symbols, $L_1$ are the number of interfering users from other sectors that are assigned with port 1000 for DMRS transmission, $L_2$ are the number of interfering users from other sectors that are assigned with ports 1002, 1003, 1006, and 1007 for DMRS transmission.

Similarly, $R_i$s are calculated on all REs from both symbols $I + N$ covariance is $R_I =$ $$\frac{R_{1,1} + R_{1,2} + R_{2,1} + R_{2,2} + R_{31} + R_{32} + \cdots + R_{12,1} + R_{12,2}}{12 \times 2}$$

Interference plus noise covariance estimation for 2-Layer SU-MIMO is performed, assuming interference plus noise estimation on double symbol DMRS within a PRB and estimation is performed for a user with ports 1000 and 1001 assigned for DMRS transmission $$y_{11} = h_1 p_1 + h_2 p_2 + \sum_{l=1}^{L_1} g_{l,1} p'_{l,1} + g_{l,2} p'_{l,2} + g_{l,3} p'_{l,3} + g_{l,4} p'_{l,4} + n_{11}$$

$$y_{12} = h_1 p_1 + h_2 p_2 + \sum_{l=1}^{L_1} g_{l,1} p'_{l,1} + g_{l,2} p'_{l,2} - g_{l,3} p'_{l,3} - g_{l,4} p'_{l,4} + n_{12}$$

$$y_{31} = h_1 p_1 - h_2 p_2 + \sum_{l=1}^{L_1} g_{l,1} p'_{l,1} - g_{l,2} p'_{l,2} - g_{l,3} p'_{l,3} + g_{l,4} p'_{l,4} + n_{31}$$

$$y_{32} = h_1 p_1 - h_2 p_2 + \sum_{l=1}^{L_1} g_{l,1} p'_{l,1} - g_{l,2} p'_{l,2} - g_{l,3} p'_{l,3} + g_{l,4} p'_{l,4} + n_{32}$$

$$y_{21} = \sum_{l=1}^{L_2} g'_{l,1} p''_1 + g'_{l,2} p''_2 + g'_{l,3} p''_3 + g'_{l,4} p''_4 + n_{21}$$

$$y_{22} = \sum_{l=1}^{L_2} g'_{l,1} p''_1 + g'_{l,2} p''_2 - g'_{l,3} p''_3 - g'_{l,4} p''_4 + n_{22}$$

$$I_{11} = y_{11} - (h_1 p_1 + h_2 p_2) \Rightarrow R_{1,1} = I_{11} \times I_{11}^H$$

$$I_{12} = y_{12} - (h_1 p_1 + h_2 p_2) \Rightarrow R_{1,2} = I_{12} \times I_{12}^H$$

$$I_{31} = y_{31} - (h_1 p_1 - h_2 p_2) \Rightarrow R_{3,1} = I_{31} \times I_{31}^H$$

$$I_{32} = y_{32} - (h_1 p_1 - h_2 p_2) \Rightarrow R_{3,2} = I_{32} \times I_{32}^H$$

$$I_{21} = y_{21} \Rightarrow R_{2,1} = I_{21} \times I_{21}^H$$

$$I_{22} = y_{22} \Rightarrow R_{2,2} = I_{22} \times I_{22}^H$$

where, $y_{11}$ the received DMRS on 1st RE in 1st symbol, $y_{12}$ is the received DMRS on 1st RE in 2nd symbol, $y_{31}$ is the received DMRS on 3rd RE in 1st symbol, and $y_{32}$ is the received DMRS on 3rd RE in 2nd symbol $g_{l,1}$ is the channel seen on port 1000 from the user in sector l, $g_{l,2}$ is the channel seen on port 1001 from the user in sector l, $g_{l,3}$ is the channel seen on port 1004 from the user in sector l, and $g_{l,4}$ is the channel seen on port 1005 from the user in sector l $I_{11}$ and $I_{12}$ are the estimated interference plus noise samples on 1st RE in 2 symbols, $I_{31}$ and $I_{32}$ are the estimated interference plus noise samples on 3rd RE in 2 symbols, and $I_{21}$ and $I_{22}$ are the estimated interference plus noise samples on 2nd RE in 2 symbols $R_{1,1}$ and $R_{1,2}$ are the estimated interference plus noise covariance matrices on 1st RE in 2 symbols, $R_{2,1}$ and $R_{2,2}$ are the estimated interference plus noise covariance matrices on 2nd RE in 2 symbols, and $R_{3,1}$ and $R_{3,2}$ are the estimated interference plus noise covariance matrices on 3rd RE in 2 symbols, $L_1$ are the number of interfering users from other sectors that are assigned with ports 1000 and 1001 for DMRS transmission, $L_2$ are the number of interfering users from other sectors that are assigned with ports 1002, 1003, 1006, and 1007 for DMRS transmission.

Similarly, $R_i$s are calculated on all REs from both symbols $I + N$ covariance is $R_I =$ $$\frac{R_{1,1} + R_{1,2} + R_{2,1} + R_{2,2} + R_{31} + R_{32} + \cdots + R_{12,1} + R_{12,2}}{12 \times 2}$$

FIG. 13 shows a block diagram representation of a two-stage filtering, in accordance with an embodiment of the present disclosure. As shown in the FIG. 13, radio unit (RU) and distributed unit (DU) is split in two-stage filtering when filtered CSI, filtered interference samples are passed from the RU to the DU to measure interference plus noise covariance and filtered data is passed from the RU to the DU for equalization at the DU.

The RU estimates CSI and measures 1st interference and 2nd interference information from the received RS. And RU measures interference plus noise covariance using 1st and 2nd interference information. RU generates filter coefficients based on estimated CSI and measured interference plus noise covariance to perform first stage filtering. RU passes filtered CSI, filtered 1st interference and 2nd interference samples and filtered data to the DU. The DU measures the interference plus noise covariance using the filtered interference samples. The DU generates the filter coefficients using the filtered CSI and the measured interference plus noise covariance. The filtered coefficients are applied on the received filtered data to perform a second stage filtering and generate equalized data.

The first stage filtering is one of DFT weight combining, Matched Filter (MF), Maximal Ratio Combining (MRC), Minimum Mean Square Error (MMSE) equalization, Interference Rejection Combining (IRC), and Minimum Mean Square Error—Interference Rejection Combining (MMSE-IRC), etc. The DFT weight combining is a method that does not require knowledge of Channel State Information (CSI) and interference plus noise covariance associated with the received RS. The second stage filtering are one of MF, MRC, MMSE equalization, IRC followed by MRC, and IRC followed by MMSE.

In an embodiment a communication network comprising a plurality of gNBs or base stations that are spatially distributed in a geographic region; at least one gNB schedules at least one user equipment (UE) that is attached to said at least one gNB. The at least one BS signals to the at least one UE at least one antenna port number among the plurality of antenna port numbers to be used for RS transmission. The at least one UE transmits data in at least one OFDM symbol and reference signal (RS) in at least one RS symbol, wherein said RS is transmitted in the signaled at least one antenna port number, the at least one RS symbol comprises of occupied RS subcarriers and null subcarriers, said location of occupied RS subcarriers and null subcarrier positions are selected according to signaled at least one antenna port.

In an embodiment, each BS receives received data corresponding to data of one or more UEs and received RS corresponding to transmitted RS of one or more UEs corresponding to at least one receive antenna. Each BS estimates channel parameters using the occupied subcarriers associated with the received RS and interference parameters using the null subcarriers associated with the received RS, corresponding to the at least one receive antenna. Each BS uses the received data, and measured channel and interference parameters corresponding to at least one receive antenna for data detection.

The at least one BS signals to the at least one UE at least one antenna port number among the plurality of antenna port numbers to be used for RS transmission, such that the port signaled by at least two different BS are distinct. The channel parameters may include a channel state information (CSI). The data detection include equalization, wherein said equalization include equalization coefficients that are determined using at least one of the CSI and the interference plus noise covariance.

FIG. 14 shows a flowchart illustrating a method for communication in a communication network, in accordance with some embodiments of the present disclosure.

As illustrated in FIG. 14, the method 1400 comprises one or more blocks for communication in a communication system. The communication network comprising a plurality of BSs spatially distributed in a geographic region, at least one UE being communicatively connected to a BS. The method 1400 may be described in the general context of computer executable instructions. Generally, computer executable instructions can include routines, programs, objects, components, data structures, procedures, modules, and functions, which perform functions or implement abstract data types.

The order in which the method 1400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 1410, signaling, by the transmitter configured in the BS, at least one antenna port number from a plurality of antenna port numbers to the at least one UE for reference signal (RS) transmission. In an embodiment, the RS is a demodulation reference signal (DMRS). In an embodiment, location of occupied RS subcarriers and null subcarrier positions are selected with one of one OFDM symbol and one or more OFDM symbols. Each of the plurality of BS signals at least one antenna port from a plurality of antenna port numbers to a connected UE. The port number signaled by at least two BS are distinct.

At block 1420, receiving, by the receiver configured in the BS, a data and a RS corresponding to the at least one UE. The data and the RS are being received on one or more receive antennas of the at least one BS. The RS comprises of occupied RS subcarriers and null subcarriers, a location of occupied RS subcarriers and null subcarrier positions are selected according to signaled at least one antenna port.

At block 1430, estimating, by the estimator configured in the BS, one or more channel parameters using the occupied subcarriers associated with the received RS, and interference plus noise parameters using the null subcarriers. The channel parameters and interference plus noise parameters are associated with one or more receive antennas of the BS. The channel parameters are channel state information (CSI) associated with the at least one connected UE, in an embodiment. Also, estimating an interference plus noise covariance using the interference plus noise parameters is performed.

At block 1440, equalizing, by the equalizer configured in the BS, the received data on the one or more receive antennas using the measured channel parameters and the interference plus noise parameters corresponding to the at least one signaled port for interference rejection and data detection. The equalizing includes one or more equalization coefficients that are determined using at least one of the CSI and the interference plus noise covariance. Thus, the inter-cell interference is reduced and reliability of the measured I+N covariance is increased.

Further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

We claim:

1. A method for communication in a communication network, said communication network comprising a plurality of base stations (BSs) spatially distributed in a geographic region, at least one user equipment device (UE) being connected to a BS, the method comprising:
    signaling, by the BS, at least one antenna port number from a plurality of antenna port numbers to the at least one UE, for reference signal (RS) transmission;
    receiving, by the BS, a data and a RS corresponding to the at least one UE, the data and the RS are being received on one or more receive antennas of the at least one BS, wherein the RS comprises occupied RS subcarriers and null subcarriers, a location of occupied RS subcarriers and null subcarrier positions are selected according to the signaled at least one antenna port;
    estimating, by the BS, one or more channel parameters and interference plus noise parameters using the occupied subcarriers associated with the received RS, and interference plus noise parameters using the null subcarriers, wherein said channel parameters and said interference plus noise parameters are associated with one or more receive antennas of the BS; and
    equalizing, by the BS, the received data on the one or more receive antennas using the measured channel parameters and the interference plus noise parameters corresponding to the at least one signaled port for interference rejection and data detection.

2. The method as claimed in claim 1, wherein the RS is a demodulation reference signal (DMRS).

3. The method as claimed in claim 1, wherein the location of the occupied RS subcarriers and the null subcarrier positions are associated with one or more orthogonal frequency-division multiplexed (OFDM) symbols.

4. The method as claimed in claim 1, wherein each of the plurality of BS signals at least one antenna port from a plurality of antenna port numbers to a connected UE, wherein the port number signaled by at least two BS are distinct.

5. The method as claimed in claim 1, wherein the channel parameters are channel state information (CSI) associated with the at least one connected UE.

6. The method as claimed in claim 1, wherein method comprises estimating an interference plus noise covariance using the interference plus noise parameters.

7. The method as claimed in claim 5, wherein the equalizing includes one or more equalization coefficients that are determined using at least one of the CSI and the interference plus noise covariance.

8. The method as claimed in claim 6, wherein the equalizing includes one or more equalization coefficients that are determined using at least one of the CSI and the interference plus noise covariance.

9. A base station (BS), the BS comprising:
    a transmitter configured to signal at least one antenna port number, of a plurality of antenna port numbers, to the at least one user equipment device (UE), wherein the at least one antenna port number corresponds to a reference signal (RS);

a receiver configured to receive a data signal and the RS from the at least one UE, wherein the RS comprises a plurality of occupied RS subcarriers and a plurality of null subcarriers, and wherein a location of the occupied RS subcarriers and the null subcarrier positions are selected according to the signaled at least one antenna port;

a channel estimator configured to estimate a channel parameter and an interference plus noise parameter according to the occupied subcarriers and the null subcarriers; and an equalizer configured to equalize the received data signal using the estimated channel parameter and the estimated interference plus noise parameter.

10. The BS as claimed in claim 9, wherein the RS is a demodulation reference signal (DMRS).

11. The BS as claimed in claim 9, wherein the location of the occupied RS subcarriers and the null subcarrier positions are associated with one of more orthogonal frequency-division multiplexed (OFDM) symbols.

12. The BS as claimed in claim 9, wherein the port number signaled by the BS is different than a port number signaled by another BS.

13. The BS as claimed in claim 9, wherein the channel parameters are channel state information (CSI) associated with the at least one connected UE.

14. The BS as claimed in claim 9, wherein the channel estimator is configured to estimate an interference plus noise covariance according to the interference plus noise parameters.

15. The BS as claimed in claims 13, wherein the equalizer is configured to determine one or more equalization coefficients according to at least one of the CSI and the interference plus noise covariance.

16. The BS as claimed in claims 14, wherein the equalizer is configured to determine one or more equalization coefficients according to at least one of the CSI and the interference plus noise covariance.

* * * * *